(12) United States Patent
Armstrong

(10) Patent No.: US 11,454,308 B2
(45) Date of Patent: Sep. 27, 2022

(54) EDDY CURRENT BRAKE APPRATUS, SYSTEMS, AND RELATED METHODS FOR USE WITH ACTUATORS HAVING A FAIL-SAFE MODE OF OPERATION

(71) Applicant: NELES USA Inc., Shrewsbury, MA (US)

(72) Inventor: Leonard T. Armstrong, East Falmouth, MA (US)

(73) Assignee: NELES USA Inc., Shrewsbury, MA (US)

( * ) Notice: Subject to any disclaimer, the term of this patent is extended or adjusted under 35 U.S.C. 154(b) by 34 days.

(21) Appl. No.: 16/953,679

(22) Filed: Nov. 20, 2020

(65) Prior Publication Data

US 2022/0163102 A1 May 26, 2022

(51) Int. Cl.
*F16D 63/00* (2006.01)
*F16H 37/06* (2006.01)
*F16D 121/20* (2012.01)

(52) U.S. Cl.
CPC ......... *F16H 37/065* (2013.01); *F16D 63/002* (2013.01); *F16D 2121/20* (2013.01); *F16H 2702/02* (2013.01)

(58) Field of Classification Search
CPC ... F16D 63/00–02; F16H 33/04; H02K 49/04; H02K 49/043
See application file for complete search history.

(56) References Cited

U.S. PATENT DOCUMENTS

| | | | |
|---|---|---|---|
| 4,114,465 A | 9/1978 | Troy | |
| 4,825,984 A | 5/1989 | Morris et al. | |
| 5,711,404 A * | 1/1998 | Lee | H02K 49/043 188/164 |
| 6,431,317 B1 | 8/2002 | Coe | |
| 7,777,600 B2 | 8/2010 | Brooks | |
| 2017/0122420 A1 * | 5/2017 | Armstrong | F16H 33/00 |

FOREIGN PATENT DOCUMENTS

| | | | | |
|---|---|---|---|---|
| DE | 4024078 A1 * | 1/1992 | | B60T 8/00 |
| JP | 0469496 A1 * | 2/1992 | | H02K 49/043 |
| WO | WO 95/24537 A1 | 9/1995 | | |

OTHER PUBLICATIONS

International Search Report and Written Opinion dated Feb. 8, 2022 in PCT/US21/59761, citing documents AA through AD and AO therein, 16 pages.

* cited by examiner

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

Aspects of the disclosure provide an electric actuator including a first driving source coupled to an output through a first pathway created by a transmission, a second driving source coupled to the output though a second pathway created by the transmission that, upon the electric actuator losses electrical power to the electric actuator, causes the output to be positioned at a fail-safe position, a differential coupled to the first driving source and the second driving source through a third pathway created by the transmission to store energy from the first driving source in the second driving source, and an eddy current brake coupled to the output through the transmission that reduces a speed at which the second driving source moves the output to the fail-safe position.

13 Claims, 10 Drawing Sheets

EDDY CURRENT BRAKE APPRATUS, SYSTEMS, AND RELATED METHODS FOR USE WITH ACTUATORS HAVING A FAIL-SAFE MODE OF OPERATION

FIELD OF THE DISCLOSURE

This application relates generally to brakes and, more particularly, to eddy current brake apparatus, systems, and related method for use with actuators having a fail-safe mode of operation.

BACKGROUND

Typically, actuators, such as electric actuators, are used in industrial applications to control positioning of devices, such as valves, dampers, gates, or the like. In chemical, petroleum, gas, and related industries, actuators are employed for controlling the flow of liquid from one location to another. For example, in boilers related applications, stem flow to a turbine may be controlled through a flow control valve. In certain situations, flow of hazardous chemicals may be controlled from one location to another. In such applications, it may be necessary to terminate fluid flow in emergency situations, such as the loss of electrical power, in order to prevent loss of fuel and/or the undesirable effects of contamination or pollution.

Actuator technologies can be designed with a fail-safe feature upon power loss. Fail-safe features in an actuator can be activated when power loss or other external failure condition causes the actuator to move the valve or damper to a pre-determined position, without benefit of external electric power. Fail-safe actuation has been approached in several ways. Some approaches involve energy storage techniques, such as a spring that is used to move a valve or a damper to a certain pre-determined position, such as a closed position. For example, in U.S. Pat. No. 6,431,317, a fail-safe actuation approach includes a transmission and cam-clutch system used to transmit a potential energy stored in the spring to achieve a desired output. However, such a transmission system occupies high volume, requires high torque, is complex, and susceptible to failure. Additionally, in such a mechanical spring return electric actuator, the loss of electrical power typically causes the actuator to rapidly stroke to its fail position (e.g., in 1 second or less). This fast movement may cause damage to the actuator and/or any equipment attached to the actuator. For example, in certain water line applications, a substantial fluid pressure surge (sometimes referred to as a water hammer) may be induced as a result of a fluid valve rapidly opening or closing. Some known actuators are provided with known friction brakes to facilitate controlling or stopping motion in an electric actuator.

SUMMARY

An exemplary electric actuator includes a first driving source coupled to an output through a first pathway created by a transmission. The electric actuator can include a second driving source coupled to the output through a second pathway created by the transmission that, upon loss of electrical power to the electric actuator, causes the output to be positioned at a fail-safe position. A differential can be coupled to the first driving source and the second driving source through a third pathway created by the transmission to store energy from the first driving source in the second driving source. The electric actuator can also include an eddy current brake coupled to the output through the transmission that reduces a speed at which the second driving source moves the output to the fail-safe position.

An exemplary apparatus includes an actuator configured to change from a normal operating mode to a fail-safe operating mode upon loss of electrical power to the actuator. The actuator can include a differential including a first input member, a second input member, and an output member operatively coupled together to form part of a transmission in the actuator. An output connected to the output member of the differential is movable between different positions including a fail-safe position. A first driving source connected to the first input member of the differential can be configured to drive the output when the actuator is in the normal operating mode. A second driving source connected to the second input member of the differential can be configured to drive the output when the actuator is in the fail-safe operating mode. The actuator can also include an eddy current brake connected to the differential that is driven by the second driving source when the actuator is in the fail-safe operating mode to generate a braking force. The eddy current brake is configured to apply the braking force to the output through the transmission while the output moves to the fail-safe position.

An exemplary method for driving an electric actuator includes supplying electrical power to a first driving source coupled to a differential driving a transmission coupled to an output or a second driving source. The method also includes disengaging an electromagnetic brake of the electric actuator coupled to the second driving source to enable the differential to transfer energy through the transmission from the first driving source to the second driving source. The method also includes storing energy in the second driving source from the first driving source. The method also includes engaging the electromagnetic brake to prevent the second driving source from releasing energy stored therein. The method also includes disengaging the electromagnetic brake upon loss of the electrical power to enable the differential to transfer energy through the transmission from the second driving source to the output and an eddy current brake of the electric actuator. The method also includes generating, via the eddy current brake, a braking force that is applied to the output through the transmission to reduce a speed at which the second driving source moves the output to a fail-safe position.

The forgoing general description of the illustrative implementations and the following detailed description thereof are merely exemplary aspects of the teachings of this disclosure, and are not restrictive.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
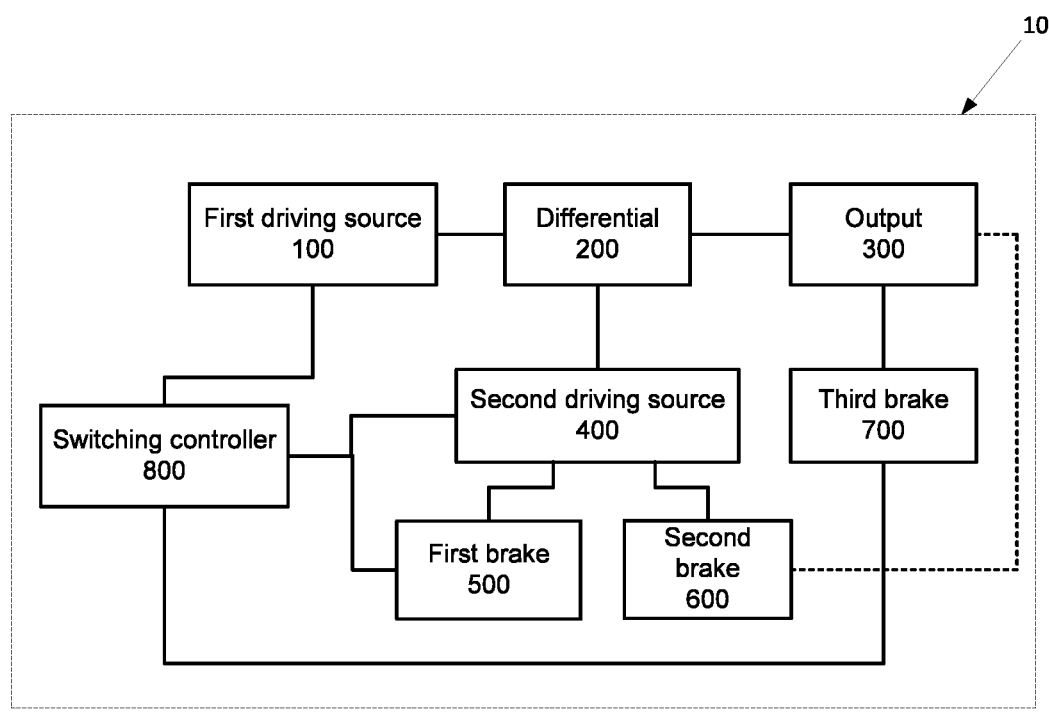
FIG. 1 is an exemplary block diagram of an actuator in which examples disclosed herein can be implemented.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Aspects of the disclosure provide eddy current brake apparatus, systems, and related methods for use with actuators having a fail-safe mode of operation. Examples disclosed herein provide an effective, compact, and low-cost solution to advantageously control output speed of an actuator during a power loss event during which a secondary driving source (e.g., a spring in the actuator storing energy) drives an output of the actuator. Some disclosed examples provide an exemplary eddy current brake that is coupled to the output through an actuator transmission, such that braking forces generated by the eddy current brake during the power loss event are applied to the output via the transmission. In particular, the disclosed eddy current brake is configured to reduce and/or limit a speed at which the secondary driving source moves the output to a fail-safe position, which prevents damage to the actuator and/or related component(s) or equipment that would have otherwise been caused by excessively rapid movement of the output, as will be discussed in greater detail below.

Generally speaking, the actuator in which examples disclosed herein can be implemented may be an actuator configured to change between different operating modes. For example, the actuator may include an electric actuator that, upon loss of electrical power supplied to the actuator, changes from (a) a normal mode in which a primary driving source (e.g., an electric motor) drives the output to (b) a fail-safe mode in which the secondary driving source drives the output. The electric actuator may also be configured to have an energy storage mode in which the secondary driving source stores energy (e.g., mechanical energy) from the primary driving source. One or more brakes of the actuator may facilitate switching between the different operating modes. For example, a first brake (e.g., an electromagnetic brake) coupled to the secondary driving source can be configured to prevent (e.g., temporarily) the release of the stored energy during normal operation. When the power loss event occurs, the secondary driving source releases (e.g., via disengaging the first brake) the stored energy, where the transmission transfers the energy from the secondary driving source to the output and the eddy current brake. In this manner, upon loss of electrical power to the actuator, the secondary driving source drives the output to the fail-safe position and also activates and/or energizes the eddy current brake, where the eddy current brake dissipates at least some of the released energy in a controlled manner.

Eddy current brakes disclosed herein are non-contacting braking mechanisms capable of functioning in the absence of electrical power. Further, the disclosed brakes are relatively small and/or use substantially fewer parts compared to the above-mentioned known friction brakes. In some examples, an exemplary eddy current brake is provided with a magnet portion and a conductor portion adjacent the magnet portion. The magnet portion is attached (e.g., adjustably attached) to a support member fixedly coupled to a part of the actuator. A body (e.g., a magnet holder) of the magnet portion holds one or more magnets (e.g., permanent magnets) creating a magnetic field in which the conductor portion is positioned. Additionally, the conductor portion may include at least one disk (e.g., constructed of conductive non-ferromagnetic metal such as aluminum, copper, and the like) coupled to the transmission that is arranged between two magnets, such that a relatively small gap exists between the disk and each magnet (i.e., the disk does not contact the magnets). The transmission applies a torque to the disk when the secondary driving source releases the stored energy, thereby rotating the disk relative to the magnetic field about a rotation axis. In particular, such rotation of the disk produces an electromagnetic field (EMF) that opposes motion of the disk and, consequently, opposes motion of transmission component(s) coupling the disk to the output. As a result, time taken for the output to reach the fail-safe position for a fail cycle substantially increases, for example, from about 1.5 seconds to about 10 seconds.

In some examples, the eddy current brake is configured to provide substantial braking only when the energy stored in the secondary driving source is released, so as not to interfere with normal operation and/or energy storage operation of the actuator. That is, when the actuator is in the normal mode and/or the energy storage mode, the eddy current brake may not provide braking, or the braking is negligible.

Braking power of the eddy current brake is proportional to the angular speed of the disk(s), thickness of the disk(s), diameter of the disk(s), air gap between the disk(s) and magnet(s) and position of the magnet(s) relative to the disk in addition to the strength of the magnet(s) and the like. As such, the braking power increases as the angular speed increases. In some examples, a gear train (e.g., a spring gear train) is utilized to couple the eddy current brake and the second driving source to a differential forming part of the transmission, where the gear train includes multiple gears connected together that are structured to increase an angular speed of the disk relative to an angular speed of an output member of the secondary driving source.

In some examples, the disclosed eddy current brake is adjustable (e.g., manually adjustable) such that the braking power can be changed, for example, at the time of build and/or after installation. In such examples, the magnet portion can be movably coupled to the support member, for example, via a fastener (e.g., a micro screw and the like) extending through a slot in the body. As such, the magnet portion can be moved in a controlled manner to adjust the position of the magnet(s) relative to the disk, thereby changing the magnetic field. By adjusting the position of the magnet(s) in such a manner, drag of the eddy current brake which controls the speed of the actuator during fail-safe operation can be increased or decreased. For example, moving the magnet portion towards an axis of the disk increases the resulting EMF as well as the drag of the eddy current brake, while moving the magnet portion away from the axis of the disk decreases the EMF as well as the drag. In such examples, the fastener can be utilized to secure the magnet portion in a particular or desired position, which ensures the braking power is consistent for the actuator until a further adjustment is desired. Accordingly, a user can easily customize braking power of the eddy current brake by interacting with the fastener and/or moving the magnet portion. In some examples, the eddy current brake can be adjusted to vary the fail cycle of the actuator, for example, between about 1.5 seconds and about 10 seconds.

Eddy current brakes disclosed herein can be advantageously utilized in a wide-range of applications to improve output control for actuators. For example, in certain water line applications, a disclosed eddy current brake can be operatively coupled to a valve actuator to effectively prevent a related fluid valve from causing a pressure surge in a fluid line when the valve actuator strokes to a fail-safe position during a power outage.

FIG. 1 is a block diagram of an example actuator (e.g., an electric actuator) 10 in which examples disclosed herein can be implemented. The actuator 10 of FIG. 1 can include a first driving source 100, a differential 200, a second driving source 400, an output 300, a first brake 500, a second brake 600, and a third brake 700. The first driving source 100 can be an electric motor that drives the output 300 through the differential 200 and an output gear train (not shown in FIG. 1). The electric motor can also drive the second driving source 400, such as a spring, through the differential 200 and a spring gear train (not shown in FIG. 1). Acting as a second driving source 400, the spring can drive the output 300 when electrical power to the electric motor is lost. Switching between the different driving sources and the output 300 can be enabled by activating and deactivating the first brake 500 and/or the third brake 700 as needed or desired.

The first driving source 100 can be any one or more devices that can drive a system and supply energy to secondary driving source(s). In some examples, the first driving source is operated by one of electrical power, mechanical power, magnetic field(s), hydraulic power, etc., or a combination thereof. In some such examples, the first driving source 100 is, for example, an electrically driven direct current (DC) motor. It should be understood that the motor can be of various type, including a permanent magnet DC motor which includes an armature that rotates inside a magnetic stator. The DC motor may be fixed speed or variable speed motor. The motor speed control can be controlled in various ways such as flux control, armature control, and voltage control.

In FIG. 1, the differential 200 can be implemented, for example, using one of a bevel gear differential, a spur gear differential, an epicyclic gear train (sometimes referred to as a planetary gear train), and the like, or a combination thereof. The differential 200 of FIG. 1 can include a first input member (e.g., a gear and/or shaft) connected to the first driving source 100, a second input member (e.g., a gear and/or a shaft) connected to the second driving source 400, and an output member (e.g., a gear and/or a shaft) connected to the output 300. In particular, the first input member, the second input member, and the output member of the differential 200 are operatively coupled together to form part of a transmission in the actuator 10, such that torque is transmittable from the first driving source 100 and/or the second driving source 400 to the output 300.

In some examples, the differential 200 includes a plurality of bevel gears mounted in a housing. For example, the differential 200 of FIG. 1 can include four bevel gears arranged such that two bevel gears rotate about a vertical axis, while the remaining two bevel gears rotate about a horizontal axis. One of the bevel gears can be rotated by the motor, and the rotation can be further transmitted to other bevel gears or the housing. Further, one of bevel gears can be fixed to obtain different combination of rotation speed, rotation direction, and torque at the housing. The housing can be fitted with an external gear to further transmit the rotation of the housing. For example, the external gear can be connected to the output 300 through an output gear train to drive the output 300. The external gear of the housing can also be connected to the spring 400 through the spring gear train to rotate the spring 400 into compression. The external gear can also be connected to the first brake 500 and/or the second brake 600 through the spring gear train.

In FIG. 1, the second driving source 400 can be any one or more devices that can store energy (e.g., mechanical energy and/or electrical energy) and supply the energy on demand and/or when electrical power is lost in order to drive a system. For example, the second driving source 400 can be a spring, a battery, compressed air, a flywheel, and the like, or a combination thereof. In some examples, the second driving source 400 is a spring that stores energy from the motor (the first driving source 100) and supplies energy to drive a transmission system when power to the first driving source 100 is lost. The spring can be implemented, for example, using one or more compression springs, one or more radial or torsion springs, and the like, or a combination thereof. The spring, when in a compressed state, stores energy in the form of potential energy.

The spring and the output 300 rotation can be arrested using one or more brakes of the actuator 10, such as the first brake 500 and the third brake 700. The brakes can be operated simultaneously or in a sequence as needed. In an embodiment, at least one of the brake(s) can be an electromagnetic device, such as a solenoid, that can be controlled by a controller. Such electromagnetic device(s) or brake(s) can either stop or hold a load when a power is on or off. Additionally or alternatively, one or more of the brakes can be spring operated or manually operated. Further, one or more of the brakes can be activated automatically or manually as needed.

The actuator 10 of FIG. 1 can have different modes of operation depending on transmission pathways created between the first driving source 100, the second driving source 400, and the output 300. In some examples, the actuator 10 is changeable and/or configured to change between a first operating mode (e.g., a normal mode), a second operating mode (e.g., an energy storage mode), and/or a third operating mode (e.g., a fail-safe mode), where each of the operating modes is associated with a unique characteristic relating to operation and/or functionality of the actuator 10. For example, when the actuator 10 is in the first operating mode thereof, the first driving source 100 is configured to drive the output 300, while the second driving source 400 is held in place by the first brake 500. In another example, when the actuator 10 is in the second operating mode, the first driving source 100 is configured to drive the second driving source 400, while the output 300 is held in place by the third brake 700. On the other hand, when the actuator 10 is in the third operating mode, the actuator 10 experiences a loss of power and the second driving source 400 can drive the output 300 as well as the second brake 600. The actuator 10 of FIG. 1 can be configured to change from the first operating mode to the third operating mode upon loss of electrical power to the actuator 10 or at least one electrically operated component thereof (e.g., the first driving source 100).

The different operating modes of the actuator 10 can be controlled by the switching controller 800. The switching controller 800 can activate or deactivate the first brake 500 and/or the third brake 700 as needed. Accordingly, the switching controller 800 is communicatively coupled to the first brake 500 and/or the third brake 700, for example, via one or more signal wires, a bus, radio frequency, etc. Further, the switching controller 800 can control electrical power supplied to the first driving source 100. Additionally, in some examples, the switching controller 800 is configured to calculate and/or control an amount of energy stored in the second driving source 400.

In FIG. 1, the second brake 600 is coupled to the output 300 through a transmission in the actuator 10, which facilitates controlling motion of the output 300 during fail-safe operation. For example, the second brake 600 of FIG. 1 can be connected to a part of the second driving source 400 via a gear train interposed between the second driving source 400 and the second brake 600. As such, energy stored in the second driving source 400 can be transferred through the gear train from the second driving source 400 to the second brake 600, where the second brake 600 dissipates at least some of the energy. Additionally or alternatively, the second brake 600 can be connected directly to the output 300. In any case, the second brake 600 of FIG. 1 is driven by the second driving source 400 when the actuator 10 is in the third operating mode to generate a braking force that is applied to the output 300 through the transmission. In particular, the second brake 600 of the present disclosure reduces and/or limits a speed (e.g., an angular speed) at which the second driving source 400 moves the output 300 to a fail-safe position. The second brake 600 can be implemented using one or more devices capable of generating a braking force in the absence of electrical power. In some examples, the second brake 600 is an eddy current brake.

Figure 2:
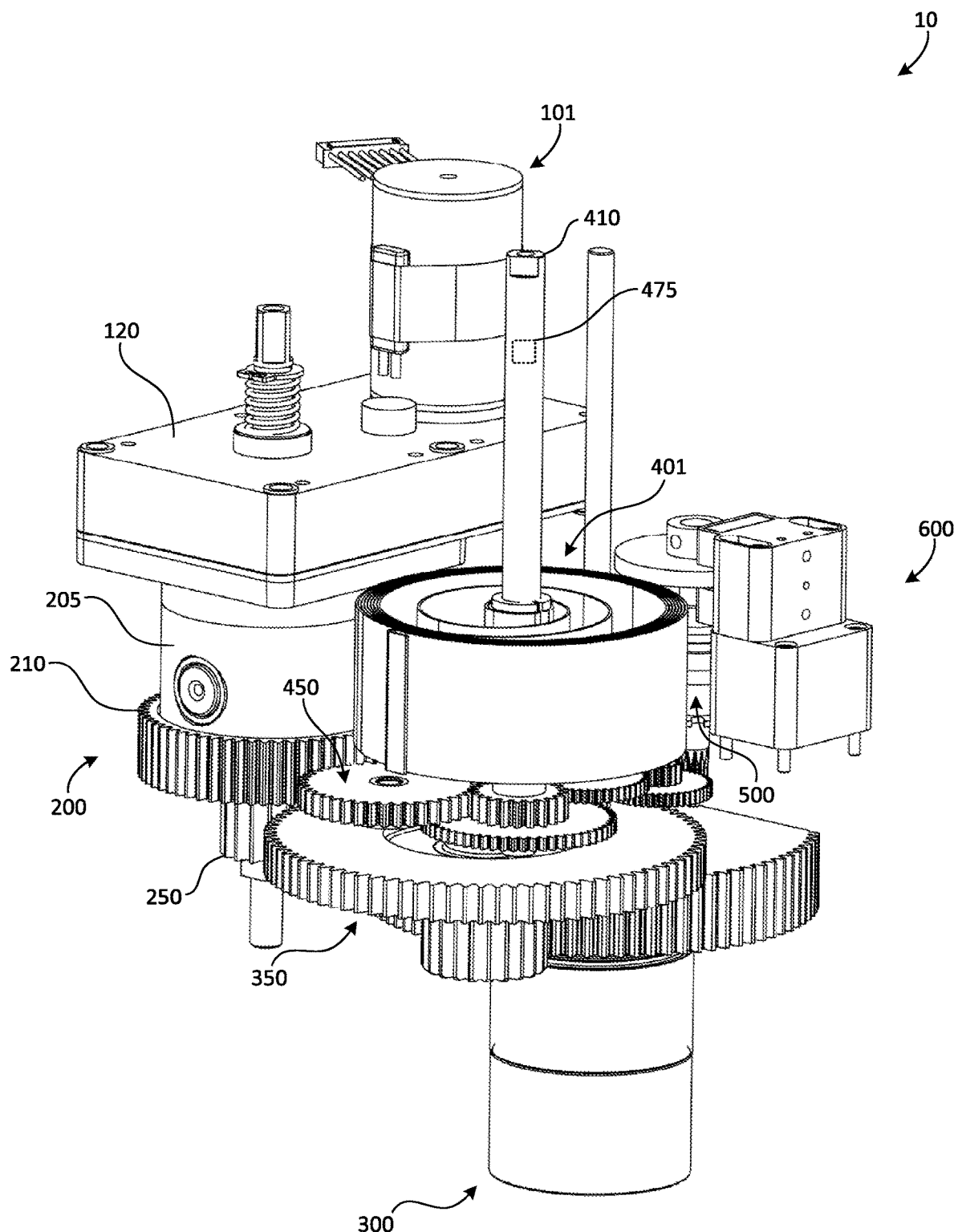
FIGS. 2 and 3 are detailed views of the actuator of according to an embodiment of the present disclosure.

FIG. 2 is a detailed view of the actuator 10 of FIG. 1 according to an embodiment of the present disclosure. The actuator 10 of FIG. 2 includes an electric motor 101 and a spring 401 that can be used to implement the first and second driving sources 100 and 400, respectively. The electric motor 101 is attached with a motor gear box 120 that includes a first transmission to adjust the electric motor 101 speed to a desired level. The motor gear box 120 can be connected to a driving shaft 201 (shown in FIG. 8) of the differential 200 to further transmit the motion to the spring 401 and/or the output 300. While FIG. 2 depicts the motor gear box 120 attaching the electric motor 101 to the differential 200, in some examples, the electric motor 101 can be directly connected to the differential 200.

In FIG. 2, the differential 200 can include a carrier 205 and an external carrier gear 210 on the carrier 205, which are fixedly coupled to each other, for example, via one or more fasteners and/or fastening methods or techniques. The carrier gear 210 can rotate a spring gear train 450 causing a spring shaft 410 to compress the spring 401. The spring shaft 410 is coupled to the spring 401 and sometimes referred to as an output member of the second driving source 400. When the spring 401 of FIG. 2 is compressed, the spring 401 stores potential energy which can be used to drive the output 300 and energize the second brake 600 in the event of a loss of electrical power to the electric actuator 10.

The spring 401 of FIG. 2 can be maintained in a compressed state by engaging the first brake 500. The first brake 500 of FIG. 2 is connected to the spring gear train 450. In particular, the first brake 500 can arrest motion of the spring gear train 450, thus locking the spring 401 in a compressed state. When the first brake 500 is dis-engaged, the spring 401 can cause the spring gear train 450 to further transmit the motion to the differential 200 and the second brake 600.

In some examples, the spring 401 can be configured to compress when rotated in a clockwise direction, and decompress when rotated in a counterclockwise direction. Of course, the spring 401 could be configured differently, for example, such that the spring 401 compresses when rotated in the counterclockwise direction and decompresses when rotated in the clockwise direction. In particular, decompression of the spring 401 causes the output 300 to be positioned in a fail-safe position (e.g., a predetermined position) upon loss of electrical power to the actuator 10. The fail-safe position of the output 300 can be, for example, a certain valve position. In some examples, the fail-safe position is a closed valve position or an open valve position. In other examples, the fail-safe position is a closed damper position or an open damper position. Accordingly, the output 300 of FIG. 2 is movable between different positions including the fail-safe position. Additionally, decompression of the spring 401 also energizes the second brake 600.

The spring 401 can be a torsional spring, which twists when a torsional force is applied at one end of the spring 401. For example, a torsional force is exerted on the spring 401 by rotating the spring shaft 410. In another embodiment, a different type of spring and corresponding compression mechanism(s) can be applied to store the potential energy. For instance, a helical spring can be compressed by placing a ball screw or a plate on top of the helical spring and turning the ball screw or pulling the plate by a cord causing compression in the helical spring. In another embodiment, a gas-spring arrangement such as a spring connected to a piston inside a cylinder can be developed to compress the spring.

The differential 200 can be mounted with a differential pinion 250 to drive the output 300. The differential pinon 250 can be driven by the electric motor 101 or the spring 401. The differential pinion 250 can drive the output 300 through an output gear train 350. In some examples, the output gear train 350 is connected to the third brake 700 to arrest a rotation of the output 300, as may be desired.

Figure 3:
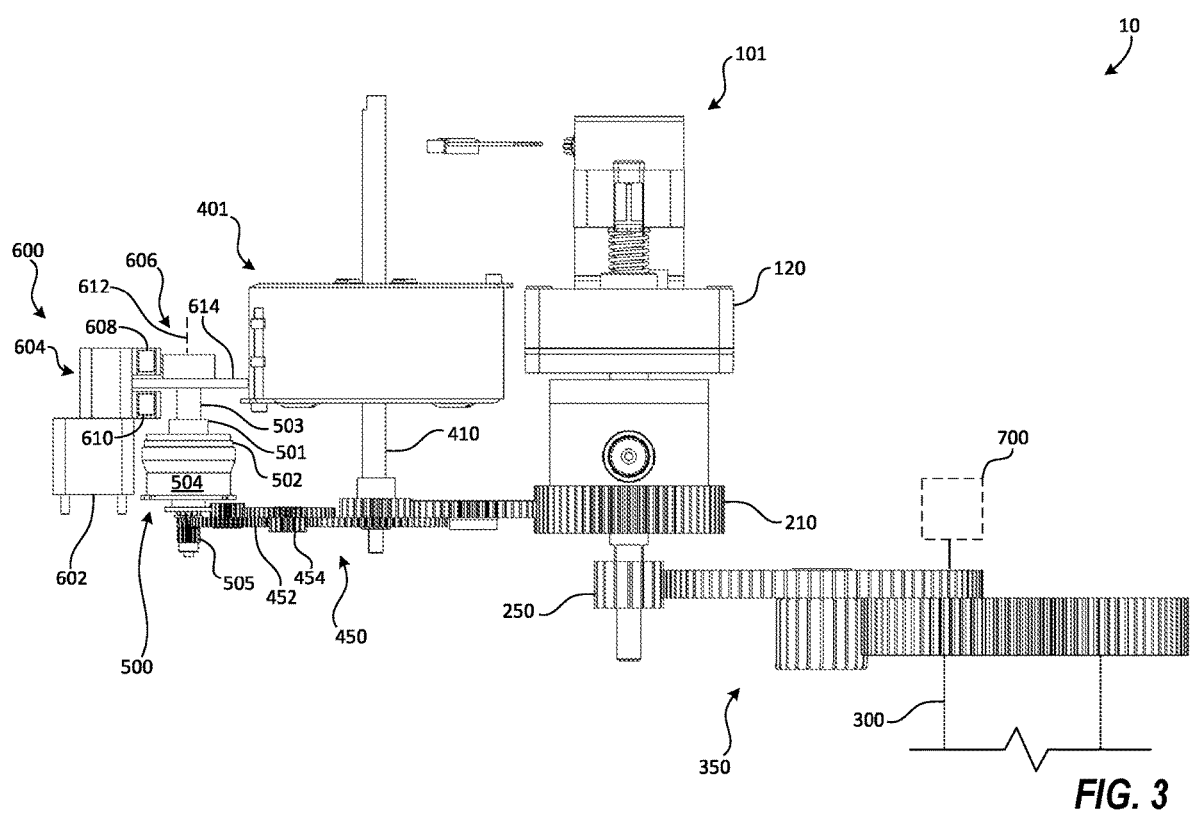

FIG. 3 is another detailed view of the actuator 10 of FIG. 1 according to an embodiment of the present disclosure. In FIG. 3, the first brake 500 is coupled to the spring gear train 450. The first brake 500 can be any one or more devices that restrict or prevent the motion of a rotating component, such as a shaft, gear, and the like. The first brake 500 in the present disclosure prevents rotation of the spring shaft 410 (e.g., when the actuator 10 is in the first operating mode). In particular, the first brake 500 of FIG. 3 is configured to hold a load when electrical power is supplied to the first brake 500 and release the load when the electrical power is lost or no longer supplied to the first brake 500. In some examples, the first brake 500 is an electromagnetic brake such as a power-on brake. In such examples, the first brake 500 is changeable and/or configured to change between (a) a first state (e.g., an energized or engaged state) in which the first brake 500 generates a braking force and applies the braking force to the spring shaft 410 and (b) a second state (e.g., a de-energized or disengaged state) in which the first brake 500 ceases generating the braking force. Such a braking force provided by the first brake 500 prevents rotation of the spring shaft 410 and, as a result, prevents the spring 401 from releasing energy stored therein during normal actuator operation.

In FIG. 3, the first brake 500 is provided with an armature 502 and a hub 501 coupled to a second pinion shaft 503 (sometimes referred to as a transmission shaft). The second pinion shaft 503 can be attached to a second pinion 505 coupled to the spring gear train 450. Additionally, to facilitate generating the braking force that is applied to the spring shaft 410, the first brake 500 is provided with an example coil 504 that can be energized by the switching controller 800. In some examples, when the coil 504 is energized resulting from electrical power being supplied to the first brake 500, the second pinion shaft 503 is locked inside the armature 502 and hub 501 assembly causing the second pinion 505 to restrict the rotation of the spring gear train 450 and the spring shaft 410. On the other hand, when the coil 504 is de-energized resulting from loss of the electrical power, the second pinion shaft 503 is un-locked from the armature 502 and hub 501 assembly causing the second pinion 505 to rotate freely. In other words, in such examples, when no power is applied to the first brake 500 or there is a power loss at the first brake 500, the second pinion 505 can rotate freely. As such, in the de-energized state of the first brake 500, the spring gear train 450 and the spring shaft 410 can rotate freely.

In some examples, the first brake 500 and the second brake 600 can be proximate to each other and/or connected to the same shaft 503, as shown in FIG. 3. As previously described, the second brake 600 controls a speed at which the second driving source 400 moves the output 300 to the fail-safe position (e.g., when the actuator 10 is in the third operating mode). In FIG. 3, the second brake 600 is provided with a support member 602 fixedly coupled to the actuator 10, for example, via one or more fasteners and/or one or more fastening methods or techniques. Additionally, the second brake 600 of FIG. 3 includes a magnet portion 604 and a conductor portion (e.g., a disk-shaped conductor) 606 adjacent the magnet portion 604 that, together, form and/or define an eddy current brake. The magnet portion 604 is attached to and/or supported by the support member 602. Further, the magnet portion 604 includes one or more magnets 608, 610 creating a magnetic field in which the conductor portion 606 is positioned. In FIG. 3, at least part of the conductor portion 606 is positioned between a first magnet 608 and a second magnet 610 spaced from the first magnet 608. The first and second magnets 608, 610 are represented by the dotted/dashed lines of FIG. 3. The conductor portion 606 can be connected to the second pinion shaft 503 to receive torque from the shaft 503 while the spring 401 releases the stored energy, where rotation of the shaft 503 causes the conductor portion 606 to rotate about an axis (e.g., a rotation axis) 612. In particular, the conductor portion 606 of FIG. 3 is rotatable relative to the magnetic field about the axis 612 to generate a braking force that is applied to the second pinion shaft 503. Such braking force is further applied to the output 300 through a particular pathway created by the transmission of the actuator 10, which reduces and/or limits the speed of the output 300.

The conductor portion 606 or at least part thereof is constructed of one or more metals having appropriate properties relating to electrical conductivity such as, for example, any of aluminum, copper, and the like. In FIG. 3, the conductor portion 606 is provided with a disk 614 between the first and second magnets 608, 610 that may be continuous around the axis 612. Of course, it should be understood that while the conductor portion 606 is shown as a single disk 614 between magnets 608, 610, this is merely an exemplary embodiment. In other embodiments, the conductor 606 can include multiple disks that are arranged between magnets as necessary to meet design requirements. For example, two or more disks could be concentrically arranged along the axis 612 and attached to the second pinion shaft 503, so that portions of the disks pass through magnet pairs as the second pinion shaft 503 rotates.

As shown in the exemplary embodiment of FIG. 3, the disk 614 or at least a portion thereof extends toward the magnet portion 604 radially outward relative to the axis 612. The disk 614 is supported by the second pinion shaft 503, where the second pinion shaft 503 substantially forms and/or defines the axis 612 about which the disk 614 can rotate. In particular, as the disk 614 rotates in the magnetic field created by the magnet(s) 608, 610, an EMF is produced which opposes motion of the disk 614 and, consequently, opposes motion of the transmission component(s) coupling the disk 614 to the output 300, such as the second pinion shaft 503, the spring gear train 450, etc. As a result, time taken for the output 300 to reach the fail-safe position for a fail cycle substantially increases.

According to the illustrated example of FIG. 3, the spring gear train 450 couples the second pinion shaft 503 to the spring shaft 410, which facilitates transferring energy from the spring 401 to the second brake 600 as well as controlling disk speed of the second brake 600. The spring gear train 450 can be provided with a plurality of gears 452 and 454 connected and/or meshed together that are structured to increase an angular speed of the second pinion shaft 503 or the disk 614 coupled thereto relative to an angular speed of the spring shaft 410. Further, the spring gear train 450 can create a certain pathway through which the spring 401 and the second brake 600 are coupled to the carrier gear 210 of the differential 200. In some examples, the first brake 500 is also coupled to the carrier gear 210 through the pathway created by the spring gear train 450. In such examples, the first brake 500 is configured to lock or arrest motion of the carrier gear 210 and the spring gear train 450 to prevent the spring 401 from releasing energy stored therein.

In some examples, the second brake 600 is adjustable (e.g., manually adjustable) such that braking power of the second brake 600 can be changed. For example, the magnet portion 604 may be movably coupled to the support member 602, where the magnet portion 604 can move across the support member 602 relative to the disk 614. Such relative movement of the magnet portion 604 adjusts the positions of the magnet(s) 608, 610, thereby changing the magnetic field created by the magnet(s) 608, 610. By adjusting the position of the magnet(s) in such a manner, drag of the second brake 600 which controls the speed of the actuator 10 during fail-safe operation can be increased or decreased. For example, movement of the magnet portion 604 toward the disk 614 or the axis 612 increases the resulting EMF as well as the drag of the second brake 600. On the other hand, movement of the magnet portion 604 away from the disk 614 or the axis 612 decreases the EMF as well as the drag. In some examples, the magnet portion 604 is movable between at least two different positions to transition the second brake 600 from a first state (e.g., a high drag state) in which a relatively high or maximum braking force for the output 300 is achievable by the second brake 600 to a second state (e.g., a low drag state) in which a relatively low or minimum braking force for the output 300 is achievable.

The third brake 700 is represented by the dotted/dashed lines of FIG. 3. Similar to the first brake 500, the third brake 700 of FIG. 3 can be any one or more devices that restrict or prevent the motion of a rotating component such as a shaft, a gear, and the like. In particular, the third brake 700 in the present disclosure prevents at least one gear of the output gear train 350 from rotating (e.g., when the actuator 10 is in the second operating mode), thereby preventing movement of the output 300. The third brake 700 can be implemented, for example, using a solenoid brake, a pneumatic brake, a hydraulic brake, a linkage-based brake, an electromagnetic brake, and the like, or a combination thereof. The third brake 700 can be energized and de-energized by the switching controller 800. In the de-energized state, the third brake 700 can be disengaged from the output gear train 350, allowing the output 300 to freely rotate. On the other hand, in the energized state, the third brake 700 can be engaged with the output gear train 350. That is, the third brake 700 can be configured to generate a certain braking force and apply the braking force to at least one gear of the output gear train 350.

When the actuator 10 of FIG. 3 is in the second operating mode for energy storage, the motor 101 can supply energy to the spring 401 through a third pathway of the transmission. In the third pathway, the motor 101 drives the differential 200 through the motor gear box 120 causing the carrier gear 210 to drive the spring gear train 450 to rotate the spring shaft 410 connected to the spring 401. As the spring shaft 410 rotates, the spring 401 compresses to store potential energy. The amount of energy stored should be sufficient to drive the output gear train 350 to cause the output 300 to be positioned in the fail-safe position upon loss of power.

While the motor 101 drives the spring 401, the third brake 700 can be engaged to prevent rotation of the output gear train 350 coupled to the output 300 and to prevent the rotation of the differential pinion 250 of the differential 200. In addition, the first brake 500 can be dis-engaged to allow rotation of the spring gear train 450.

The number of rotations of the spring shaft 410 can be related to the amount of energy stored in the spring 401. For example, the amount of energy stored in the spring 401 can be calculated using the following energy equation 1 for a torsional spring.

$$U = \tfrac{1}{2} * k * \theta^2 \qquad (1)$$

Where, U is energy stored in joules, k is a spring constant in newton-meters/radians, and θ is number of revolutions in radians.

In another embodiment, the amount of energy needed to be stored in the spring 401 can be pre-determined experimentally. The experiment can be designed to vary different parameters such as spring type, springs stiffness, number of rotation of the spring shaft, and the like. Based on the experiment an optimal combination of parameters may be used to select an appropriate spring and number of rotations.

When the actuator 10 of FIG. 3 is in the first operation mode for normal operation, the motor 101 can supply energy to the output 300 through a first pathway of the transmission. In the first pathway, the motor 101 drives the differential 200 through the motor gear box 120 causing the differential pinion 250 to drive the output gear train 350 to rotate the output 300. Further, while the motor 101 drives the output 300, the third brake 700 is dis-engaged to allow rotation of the output gear train 350 coupled to the output 300, and the first brake 500 is engaged to prevent rotation of the spring gear train 450 coupled to the spring 401.

The third operating mode of the actuator 10 can be triggered upon loss of electrical power to the actuator 10, as previously described. When the actuator 10 of FIG. 3 is in the third operating mode, the spring 401 can supply energy to the output 300 through a second pathway of the transmission. In the second pathway, the spring 401 drives the carrier gear 210 of the differential 200, which in turn drives the output gear train 350 coupled to the output 300 causing the output 300 to be positioned in the aforementioned fail-safe position. The spring 401 can also supply energy to the second brake 600 in the second pathway of the transmission, which energizes the second brake 600 and/or causes the second brake 600 to dissipate at least some of the energy in a controlled manner. Further, while the spring 401 drives the output 300, the first brake 500 is dis-engaged to allow rotation of the spring gear train 450, and the third brake 700 is dis-engaged to allow rotation of the output gear train 350. Although the spring gear train 450 drives the differential 200, the rotation is not transmitted to the motor 101 due to the internal braking capacity of the motor 101. In another embodiment, an external brake can be coupled to the motor 101 to prevent rotation of the motor 101 in the second pathway.

Figure 4A:
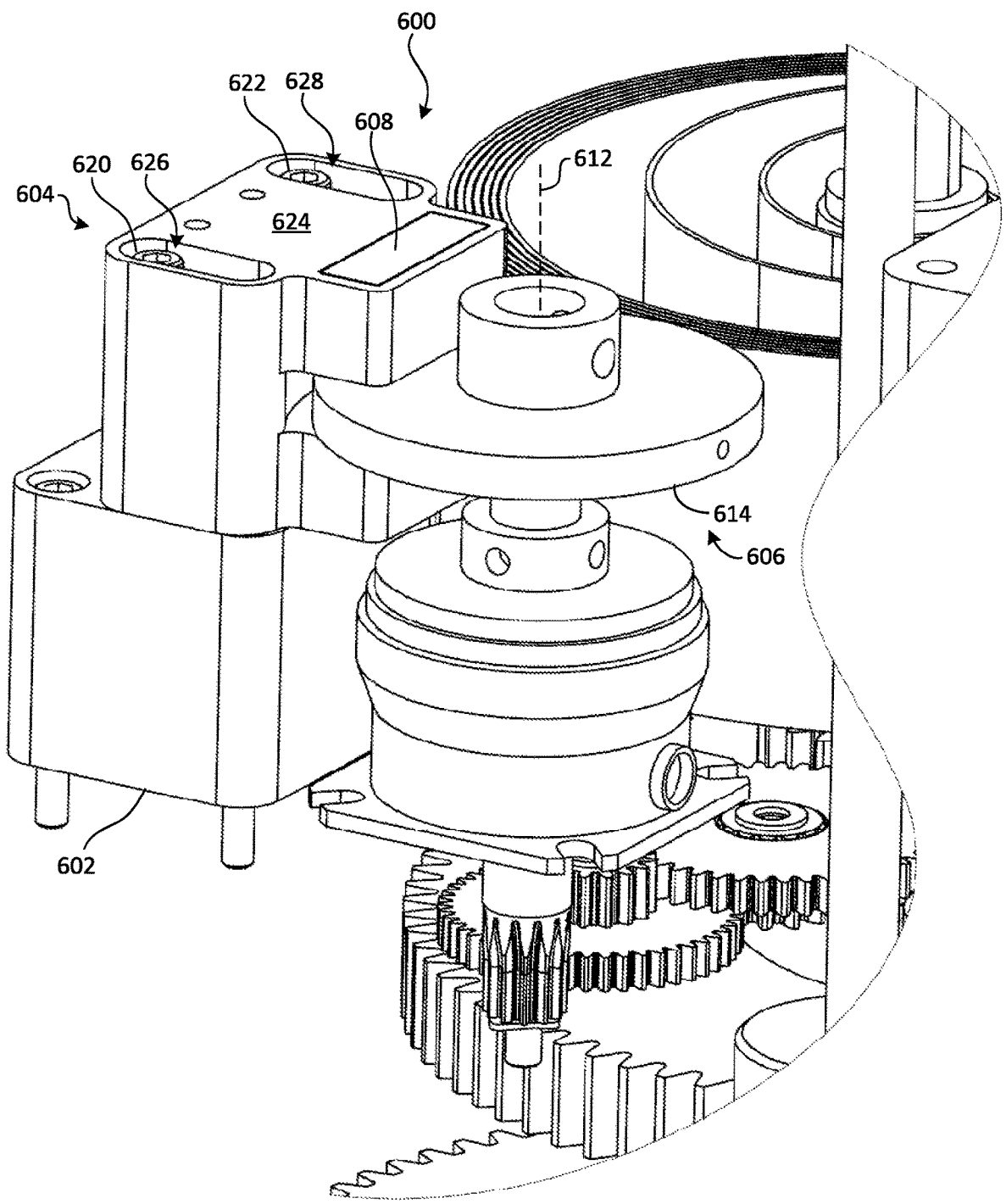
FIGS. 4A and 4B are detailed views of an exemplary brake of the actuator and show different states of the exemplary brake.
Figure 4B:
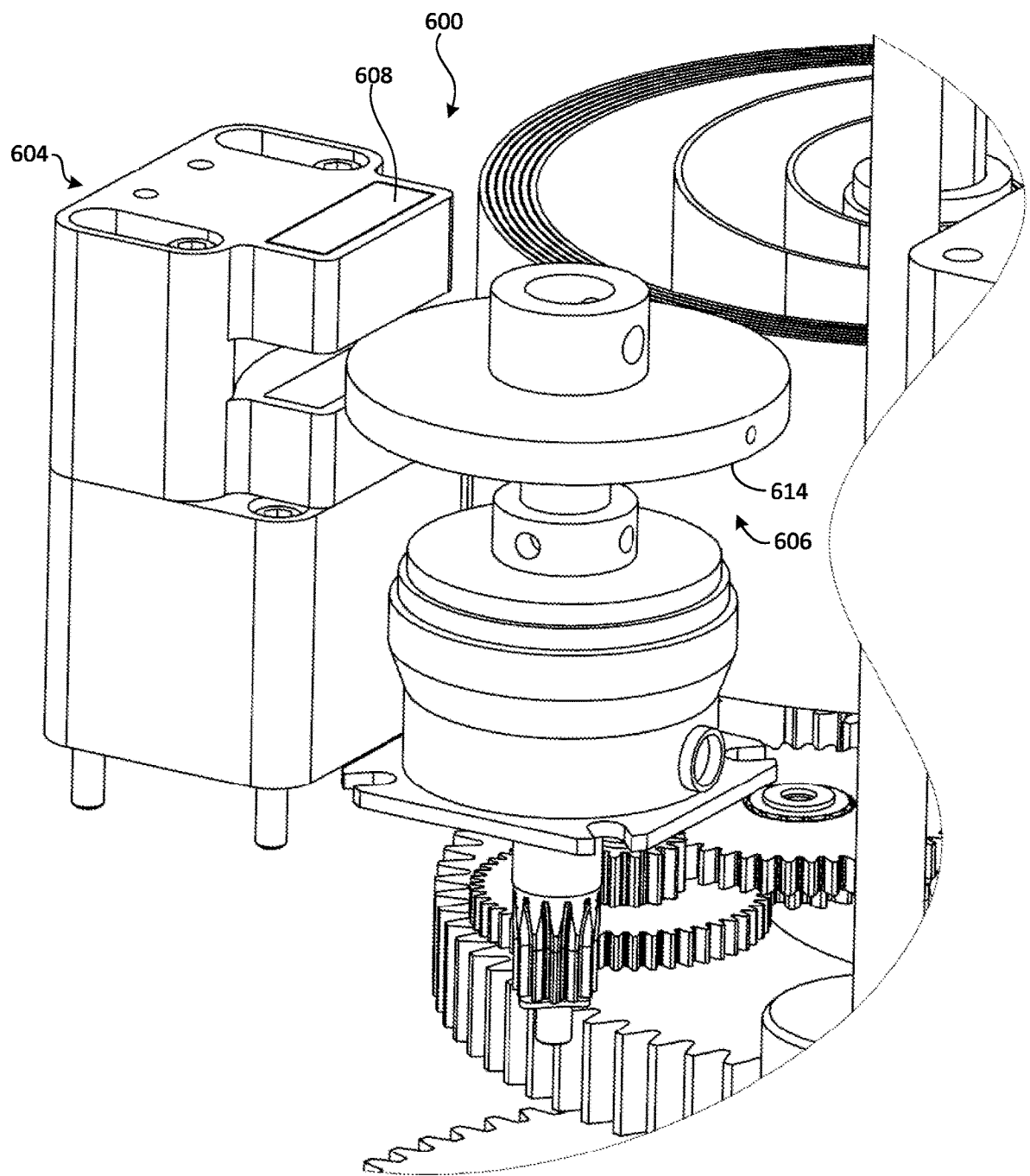

FIG. 4A is a detailed view of the second brake 600 and shows the first state thereof. The first state is associated with a first characteristic relating to drag of the second brake 600. In FIG. 4A, the magnet portion 604 is in a first position (e.g., a nearest position) relative to the conductor portion 606 in which opposite surfaces (e.g., annular surfaces) of the disk 614 face the respective first and second magnets 608, 610. The disk 614 of FIG. 4A is positioned substantially between the first and second magnets 608, 610. When the second brake 600 is in the first state, rotation of the disk 614 driven by the second driving source 400 produces a first braking force (e.g., a maximum force) applied to the output 300 through the transmission that causes the output 300 to move at a relatively low or first speed. The second brake 600, when in the first state as shown in FIG. 4B, can provide a fail cycle of the actuator 10 that is substantially 10 seconds or less. A fail cycle of the actuator 10 may be defined as the time taken for the secondary driving source 400 to move the output 300 to the fail-safe position.

In FIG. 4A, the second brake 600 is provided with one or more fasteners 620, 622 adjustably coupling the magnet portion 604 or a body 624 thereof to the support member 602, two of which are shown in this example (i.e., a first fastener 620 and a second fastener 622). The fastener(s) 620, 622 can be implemented, for example, using one or more screws (e.g., micro screws), and the like. Additionally, the magnet portion 604 of FIG. 4A is also provided with the body 624 through which the fastener(s) 620, 622 extend, which is sometimes referred to as a magnet holder. The body 624 is configured to receive and hold the magnet(s) 608, 610. As such, each of the magnet(s) 608, 610 can be fixedly coupled to a part of the body 624. In some examples, the body 624 of the magnet portion 604 defines one or more slots 626, 628 extending through the body 624 sized and/or shaped to receive the fastener(s) 620, 622. In FIG. 4A, the first fastener 620 is positioned in a first slot 626 of the body 624, while the second fastener 622 is positioned in a second slot 628 of the body 624 spaced from the first slot 626. Each of the fastener(s) 620, 622 may extend in a length direction of the respective slots 626, 628 at least partially through the support member 602 to connect the body 624 to the support member 602.

In FIG. 4A, each of the fastener(s) 620, 622 urges the body 624 into engagement with the support member 602, thereby securing a position of the magnet(s) 608, 610 relative to the disk 614. In some examples, each of the fastener(s) 620, 622 can be loosened (e.g., via a tool configured to interact with a fastener), which allows the magnet portion 604 or the body 624 thereof to move along the support member 602 from the first position to one or more different positions. For example, to make such positional adjustments, a user can apply a force to the body 624 while the fastener(s) is/are loosened. An inner surface of the body 624 defining the first slot 626 can slide against the first fastener 620 to facilitate guiding movement of the body 624 between the different positions. Similarly, a different inner surface of the body 624 defining the second slot 628 can slide against the second fastener 622 to further facilitate guiding movement of the body 624. When a desired position is achieved, each of the fastener(s) 620, 622 can be tightened (e.g., via the tool).

FIG. 4B is another detailed view of the second brake 600 and shows the second state thereof. The second state is associated with a second characteristic relating to drag of the second brake 600 different from the first characteristic. In contrast to the illustrated example of FIG. 4A, the magnet portion 604 moved from the first position to a second position (e.g., a furthest position) relative to the conductor portion 606 in which the disk 614 may be substantially spaced from the first and second magnets 608, 610. When the second brake 600 is in the second state, rotation of the disk 614 driven by the second driving source 400 produces no braking force or, in some examples, a second braking force (e.g., a minimum force) applied to the output 300 through the transmission that allows the output 300 to move at a relatively high or second speed greater than the first speed. The second brake 600, when in the second state as shown in FIG. 4B, can provide a fail cycle of the actuator 10 that is substantially 1.5 seconds or less. To provide a different desired braking force that is between maximum and minimum braking forces achievable by the second brake 600, the magnet portion 604 can be adjusted to and/or locked in a different position between the first position shown in FIG. 4A and the second position shown in FIG. 4B.

Figure 5:
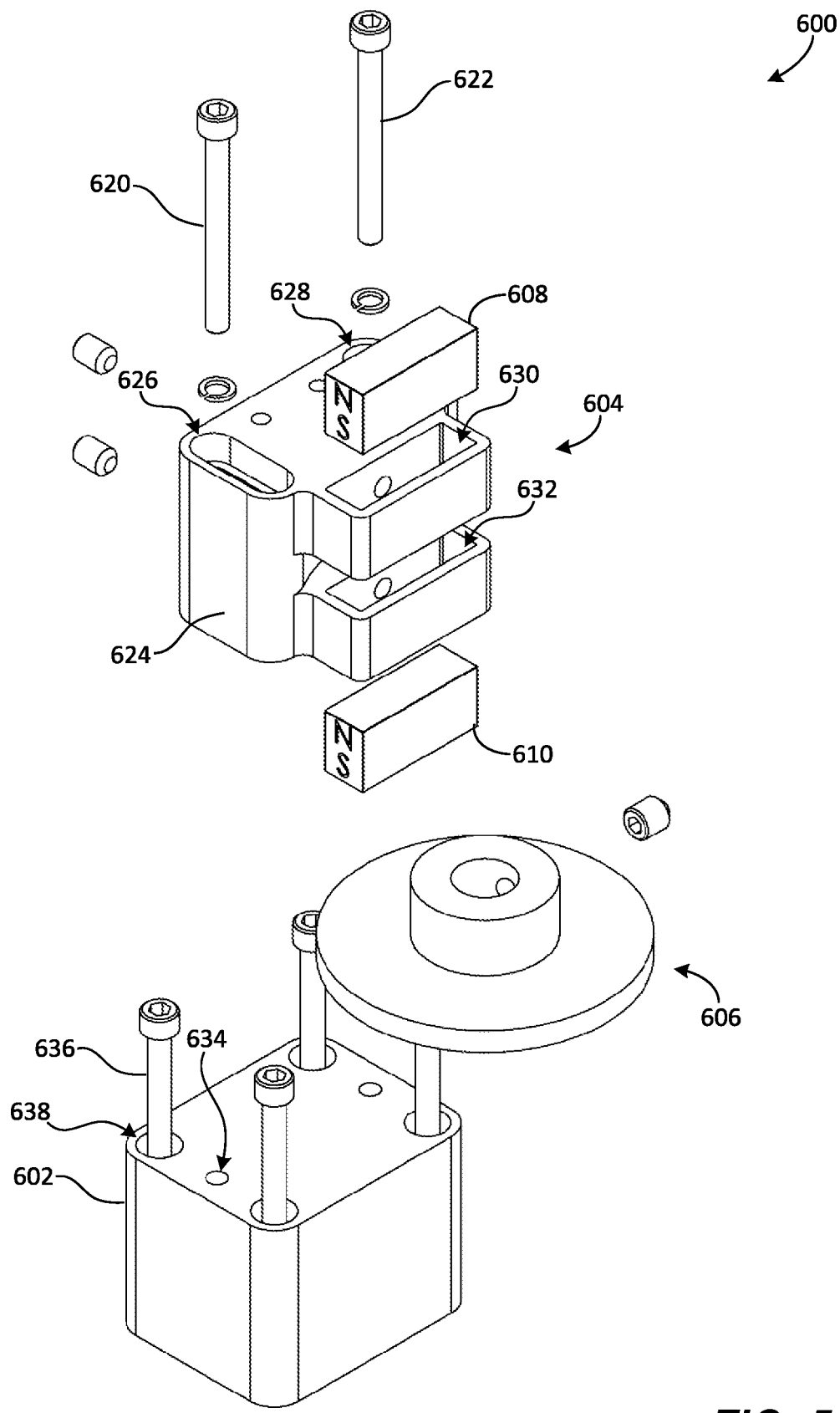
FIG. 5 is an exploded view of the exemplary brake according to an embodiment of the present disclosure.

FIG. 5 is an exploded view of the second brake 600 according to an embodiment of the present disclosure. In FIG. 5, the support member 602, the magnet portion 604, and the conductor portion 606 are spaced from each other, for clarity. To facilitate holding the magnet(s) 608, 610, the body 624 of the magnet portion 604 can include one or more receptacles 630, 632 coupled thereto, two of which are shown in this example. For example, a first receptacle 630 on the body 624 is sized and/or shaped to receive the first magnet 608, while a second receptacle 632 on the body 624 spaced from the first receptacle 630 is sized and/or shaped to receive the second magnet 610. When the magnet portion 604 is assembled, opposite poles of the first and second magnets 608, 610 may face each other. For example, a south pole of the first magnet 608 may face a north pole of the second magnet 610.

To adjustably couple the magnet portion 604 to the support member 602, the first fastener 620 of FIG. 5 may be inserted in the first slot 626, such that the first fastener 620 passes through the body 624 and enters a certain aperture (e.g., a relatively small hole) 634 in the support member 602. The second fastener 622 of FIG. 5 may be similarly inserted in the second slot 628. The second brake 600 can also be provided with one or more secondary fasteners 636 for coupling the support member 602 to a part of the actuator 10, each of which is insertable in an aperture 638 in the support member 602. The secondary fastener(s) 636 may extend through the support member 602 and at least partially into a structure (e.g., a bracket, a housing, and the like) and/or a mounting surface in the actuator 10.

Figure 6:
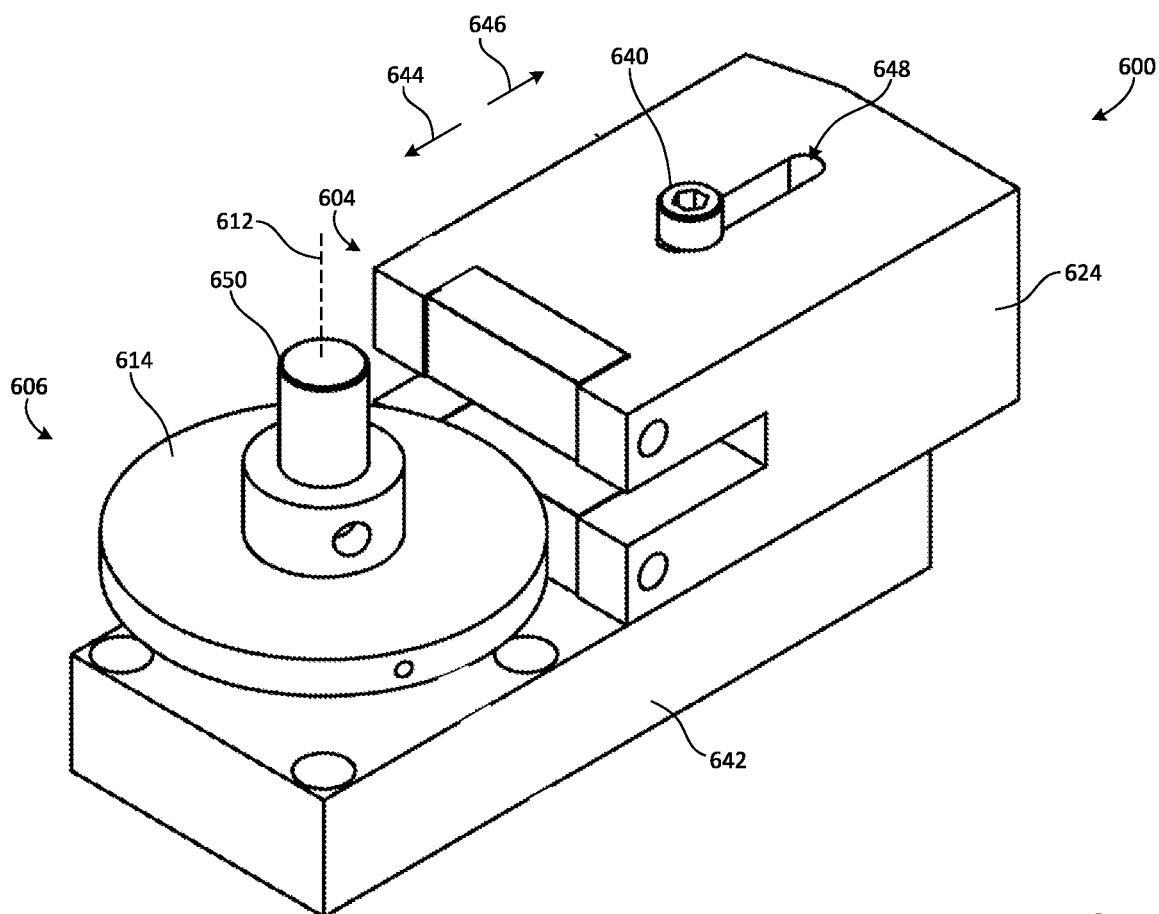
FIGS. 6 and 7 are additional detailed views of the exemplary brake of the actuator and show an implementation thereof according to an embodiment of the present disclosure.
Figure 7:
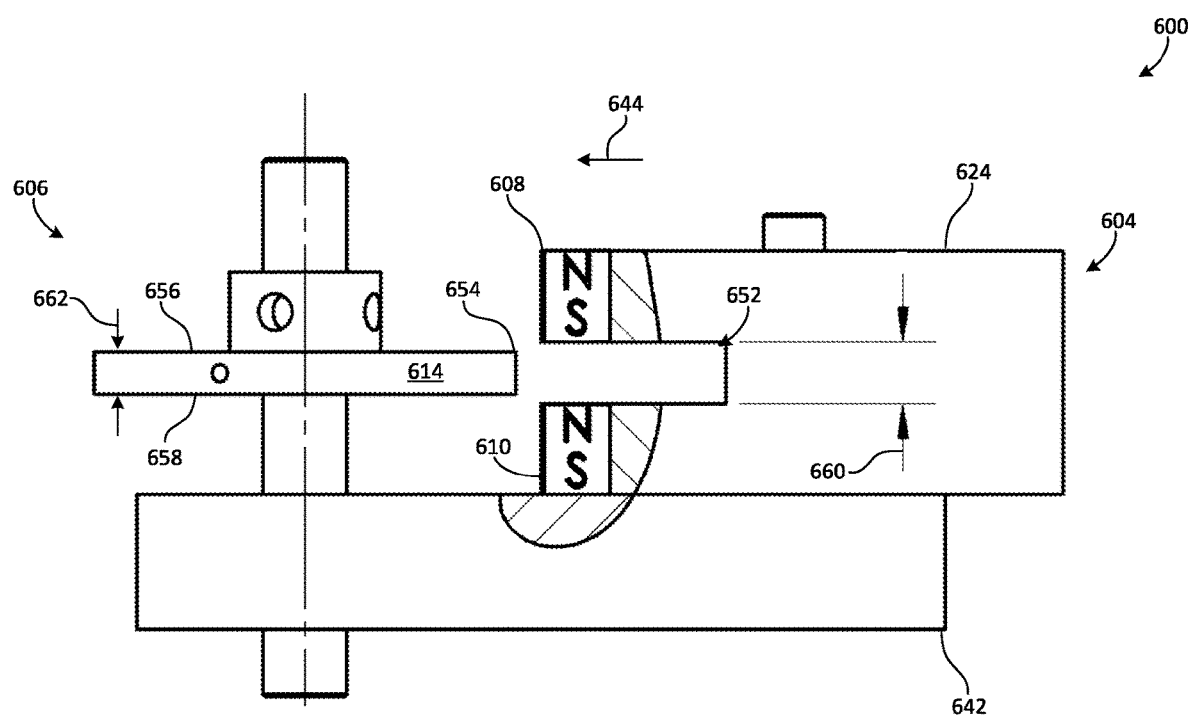

FIGS. 6 and 7 are additional detailed view of the second brake 600 of the actuator 10 and show an implementation thereof according to an embodiment of the present disclosure. Turning to FIG. 6, a perspective view of the second brake 600 is shown in the illustrated example. In FIG. 6, a single fastener 640 adjustably couples the magnet portion 604 or the body 624 thereof to a structure 642 adjacent the conductor portion 606. The structure 642 of FIG. 6 may correspond to the support member 602 previously described. In some examples, the structure 642 includes a part of the actuator 10 on which the magnet portion 604 can be supported. In some examples, the magnet portion 604 of FIG. 6 can slide along an outer surface of the structure 642 in a first direction 644 and/or a second direction 646 opposite to the first direction 644. The body 624 of FIG. 6 includes a single slot 648 thereon that is sized and/or shaped to receive the fastener 640.

Additionally, the second brake 600 of FIG. 6 is provided with an example input member (e.g., a shaft) 650 coupled to the conductor portion 606 that defines the axis 612 about which the conductor portion 606 can rotate, which may correspond to the second pinion shaft 503 previously described. As shown in FIG. 6, the input member 650 is centrally positioned on a portion of the disk 614 and/or extends at least partially through the disk 614. In some examples, the input member 650 can be rotatably supported by the structure 642. For example, one or more bearings may be interposed between the input member 650 and the structure 642, thereby rotatably coupling the input member 650 to the structure 642. As shown in FIG. 6, the structure 642 extends from the magnet portion 604 to the input member 650, and the input member 650 extends at least partially through the structure 642.

Turning to FIG. 7, a side-view of the second brake 600 is shown in the illustrated example. In FIG. 7, the body 624 of the magnet portion 604 defines an inner space 652 extending at least partially through the body 624 between the first and second magnets 608, 610 that is configured to receive an end (e.g., an outer radial end) 654 of the disk 614, which allows for effective positioning of the disk 614 relative to the magnet(s) 608, 610. For example, as the body 624 of FIG. 7 slides along the structure 642 in the first direction 644, the end 654 of the disk 614 passes into the inner space 652 to position a first outer surface 656 of the disk 614 proximate to the first magnet 608 and a second outer surface 658 of the disk 614 proximate to the second magnet 610. The first outer surface 656 may be an annular surface of the disk 614, while the second outer surface 658 may be a different annular surface of the disk 614 facing an opposite direction relative to the first outer surface 656. In some examples, a distance 660 by which the first magnet 608 is spaced from the second magnet 610 is at least slightly greater than a thickness 662 of the disk 614. In such examples, when the disk 614 is positioned in the inner space 652 between the first and second magnets 608, 610, none of the first magnet 608, the second magnet 610, or the body 624 holding the magnets 608, 610 contacts the disk 614, so that the disk 614 can rotate during braking operation without frictional interference from such components. For example, a relatively small gap may exist between the first outer surface 656 and the first magnet 608. Similarly, a relatively small gap may also exist between the second outer surface 658 and the second magnet 610.

Figure 8:
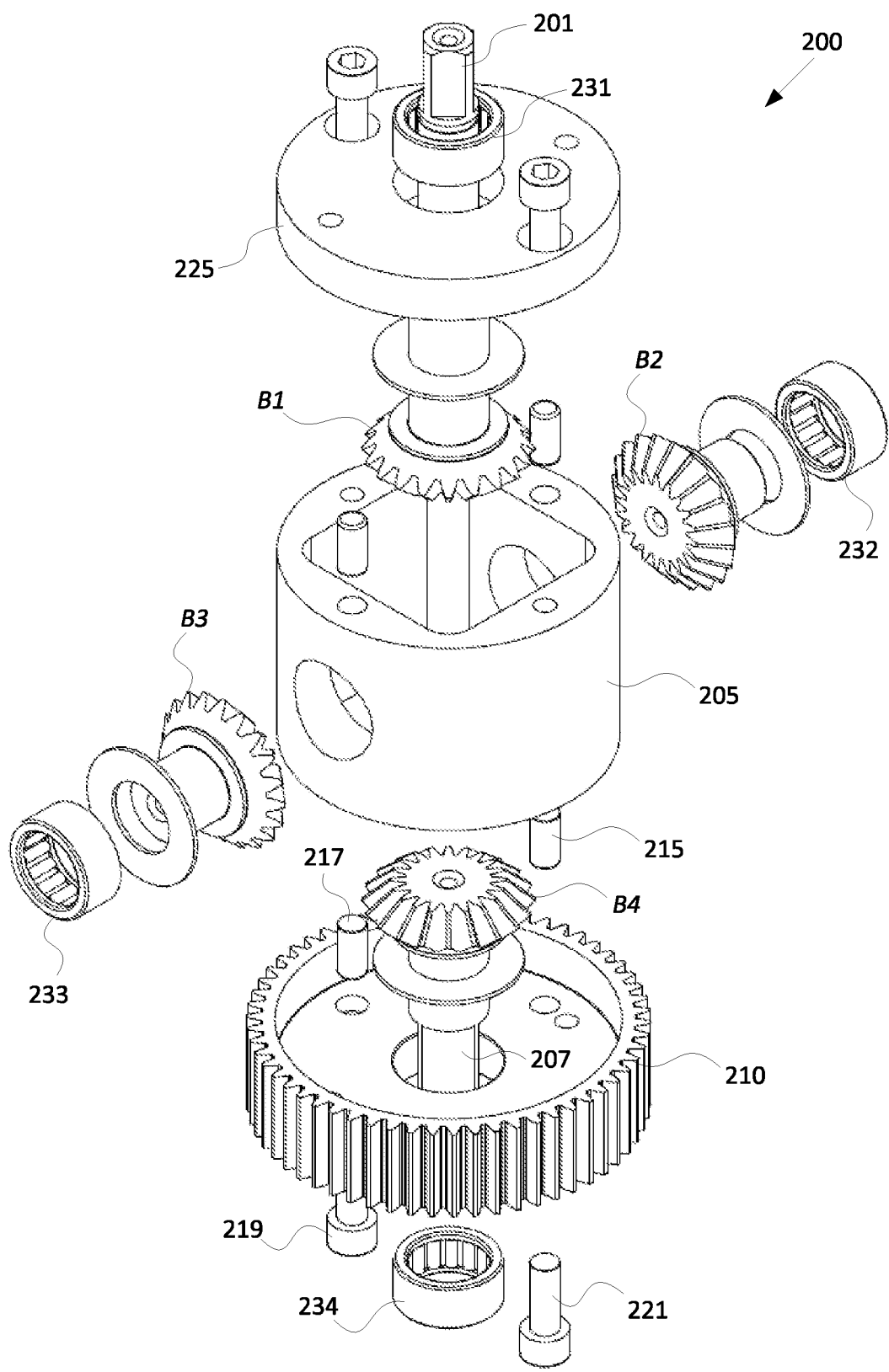
FIG. 8 is an exploded view of an exemplary differential of the actuator according to an embodiment of the present disclosure.

FIG. 8 is an exploded view of the differential 200 of the actuator 10 according to an embodiment of the present disclosure. The differential 200 of FIG. 8 includes a plurality of bevel gears B1-B4, the carrier 205 and the carrier gear 210. The plurality of bevel gears B1-B4 can be configured such that the bevel gears B1 and B4 can rotate about a vertical axis, while the bevel gears B2 and B3 can rotate about a horizontal axis. Further, the bevel gears B1 can be fixed to a driving shaft 201, which acts as the first input member of the differential 200 that can be connected to the motor 101 of the actuator 10. The bevel gear B4 can be fixed to a driven shaft 207, which acts as the output member of the differential 200 that can be connected to the output 300 of the actuator 10. The plurality of bevel gears B1-B4 meshes together within the carrier 205. The rotation of one or more of the bevel gears B1-B4 can be arrested to cause rotation of the carrier 205. For example, assuming the bevel gear B4 is fixed and the driving shaft 201 rotates in counter clockwise direction, then the rotation of the bevel gear B1 exerts a force on the meshing bevel gears B2 and B3. The tangential component of the force causes rotation of the bevel gear B2 and B3 in an opposite direction (i.e., clockwise direction). Since the bevel gear B4 is fixed, the tangential component of the force acting on the bevel gears B2 and B3 causes the carrier 205 to rotate in the clockwise direction. When the bevel gears B2 and B3 are arrested, all the gears of the differential 200 get locked.

The carrier 205 can be significantly cylindrical in shape and contain a hollow portion, within which the plurality of bevel gears B1-B4 can be assembled. The carrier 205 can be fitted with a top plate 225 to support the bevel gear B1 and to cover an opening on the top side of the carrier 205. The carrier 205 can include holes along the circumference to support the bevel gears B2 and B3. The bevel gears B1-B4 can be fitted with bearings 231-234, respectively, to support and allow free rotation of the bevel gears B1-B4. The bevel gears B1-B4 are free to rotate within the hollow portion of the carrier 205. The carrier 205 can be integral with or fixed to the carrier gear 210 using fasteners such as dowel pins 215 and 217 and screws 219 and 221, which acts as the second input member of the differential 200 that can be connected to the spring 401 and the second brake 600. The carrier gear 210 encloses an opening on the bottom side of the carrier 205.

Figure 9:
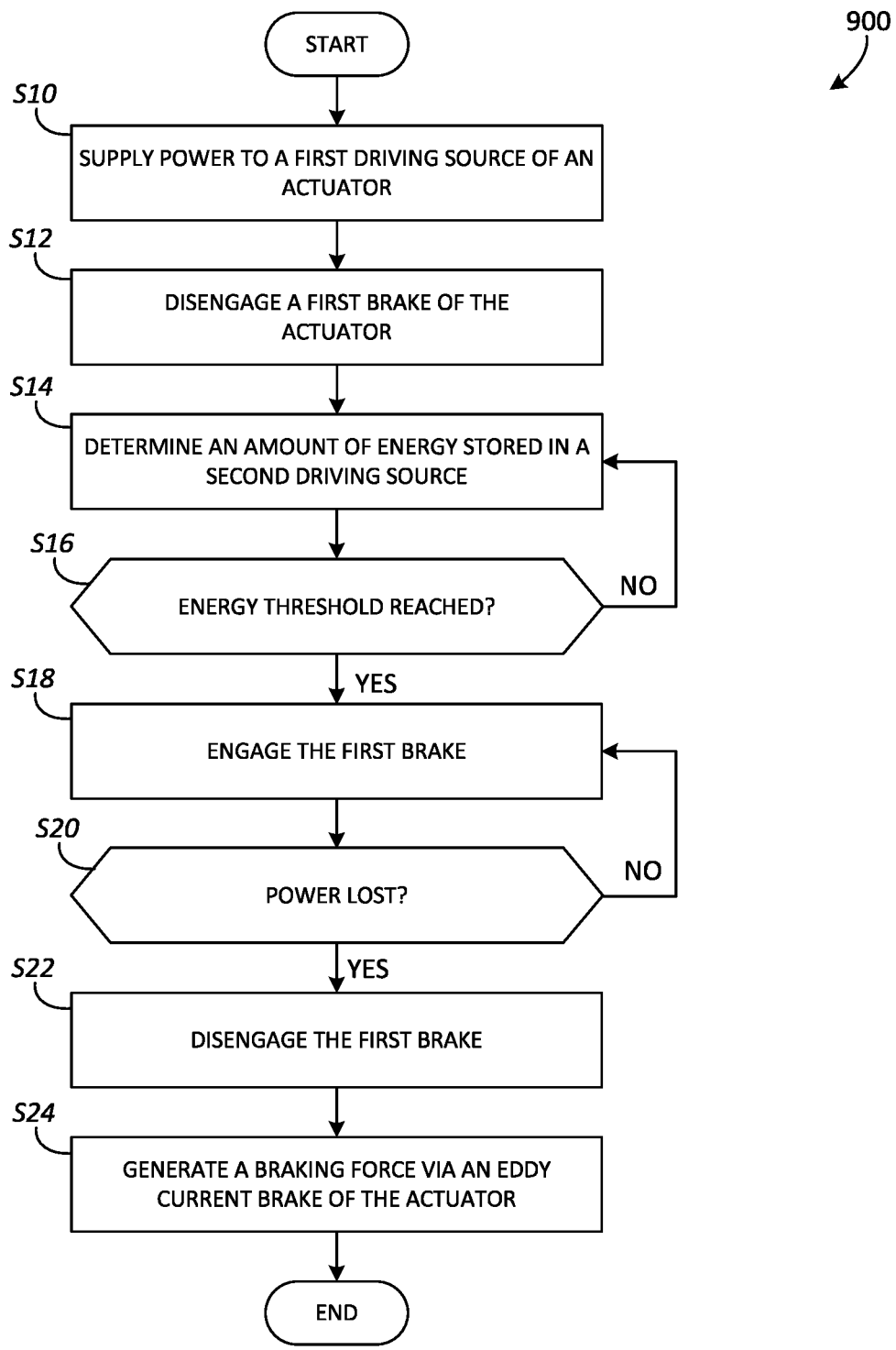
FIG. 9 is a flowchart of an exemplary method of driving an actuator according to an embodiment of the present disclosure.

FIG. 9 is a flowchart of an exemplary method 900 of driving the actuator 10 according to an embodiment of the present disclosure. The method 900 can be implemented in the switching controller 800, for example, to automate switching between different pathways in the actuator 10. The method 900 of FIG. 9 begins when the output 300 is connected to an element, such as a butterfly valve and the electric power supply is switched on. In step S10, the electric power can be supplied to the first driving source 100. For instance, the electric power can be supplied to the motor 101 of the actuator 10 causing the motor 101 and the motor gear box 120 to rotate.

In step S12, the first brake 500 can be disengaged, which enables the differential 200 to transfer energy through the transmission of the actuator 10 from the motor 101 to the spring 401. The first brake 500 can be disengaged by cutting off the power supply to the coil 504. Dis-engaging the first brake 500 allows the spring 401 to be wound to store the energy supplied to the motor 101 into the spring 401 (the second driving source 400) in the form of potential energy. Additionally, the third brake 700 may be engaged in step S12 to prevent rotation of the output 300, for example, by supplying electric power to the third brake 700.

The amount of energy stored in the second driving source 400 can be calculated in step S14. For instance, the amount of energy can be determined using equation 1 or can be pre-determined experimentally, as previously discussed. Alternatively, a sensor 475 can be installed on the spring shaft 410 to count the number of rotations or load, such as a torsional load, on the spring shaft 410. The sensor 475 can transmit signal to the switching controller 800. The number of rotations or load can be predetermined experimentally and correlated to the amount of energy stored in the spring 401. Alternatively, the number of rotations or load can be correlated to the amount of rotation or load required to position the output 300 in a fail-safe position. For example, to close a valve from an open position, the output 300 may have to rotate 10 times. To enable 10 revolutions of the output 300, the spring shaft 410 may have to rotate at least 25 times. As such, when the spring shaft rotates at least 25 times, the controller 800 can execute the next step S16.

In step S16, a determination can be made whether an energy threshold has been reached. The energy threshold corresponds to at least an amount of energy required to drive the output 300 to a fail-safe position. If the energy threshold is not reached, the motor 101 keeps winding the spring 401 and the process in step S14 can be performed until the energy threshold is reached.

Once the energy threshold is reached, power supplied to the first driving source 100 can be turned off, and the first brake 500 and the third brake 700 can be engaged. When the power supply to the first driving source 100 is turned back on, the first brake 500 can remain engaged in step S18, which prevents the second driving source 400 from releasing the energy stored therein during normal operation. Additionally, the third brake 700 can be dis-engaged in step S18 to allow the motor 101 to drive the output 300, for example, by switching off the power supply to the third brake 700.

In step S20, a determination can be made whether the actuator 10 has lost electric power. If not, the controller 800 can continue to monitor for power loss. Alternatively, the controller 800 can continue to execute the process in step S18. On the other hand, if the power is lost, the first brake 500 can be disengaged by the loss of power supply to the coil 504 in step S22, which enables the differential 200 to transfer the stored energy through the transmission from the spring 401 to both the output 300 and the second brake 600. Additionally, the third brake 700 may also be disengaged in step S22. Disengaging the first brake 500 and the third brake 700 allows the spring 401 (the second driving source 400) to drive the output 300 to a fail-safe position. Then, in step S24, the second brake 600 generates a braking force that is applied to the output 300 through the transmission while the output 300 moves to the fail-safe position, thereby reducing a speed at which the spring 401 moves the output 300 to the fail-safe position.

Additionally, in some examples (e.g., where the second brake 600 is adjustable), the example method 900 of FIG. 9 also includes a step for adjusting the braking force generated by the second brake 600. In such examples, in an additional step, the magnet portion 604 of the second brake 600 is adjusted (e.g., moved in the first or second direction 644, 646) relative to the conductor portion 606 and then secured in place via at least one of the fasteners 620, 622, 640 previously described.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, and apparatuses described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An electric actuator, comprising:
   a first driving source coupled to an output through a first pathway created by a transmission;
   a second driving source coupled to the output through a second pathway created by the transmission that, upon loss of electrical power to the electric actuator, causes the output to be positioned at a fail-safe position;
   a differential coupled to the first driving source and the second driving source through a third pathway created by the transmission to store energy from the first driving source in the second driving source; and
   an eddy current brake coupled to the output through the transmission that reduces a speed at which the second driving source moves the output to the fail-safe position.

2. The electric actuator of claim 1, wherein the eddy current brake includes:
   a support member fixedly coupled to the electric actuator;
   a magnet portion supported by the support member including one or more permanent magnets creating a magnetic field; and
   a conductor portion in the magnetic field adjacent the magnet portion and connected to a transmission shaft to receive torque from the transmission shaft, the conductor portion rotatable relative to the magnetic field about an axis to generate a braking force that is applied to the output through transmission.

3. The electric actuator of claim 2, wherein the magnet portion is adjustably coupled to the support member such that the magnet portion is movable relative to the conductor portion to change the braking force.

4. The electric actuator of claim 3, wherein the magnet portion includes a body holding the one or more permanent magnets and defining a slot that extends through the body in which a fastener connecting the body to the support member is positioned.

5. The electric actuator of claim 2, further including a gear train coupling the conductor portion of the eddy current brake to an output member of the second driving source, the gear train including a plurality of gears connected together structured to increase an angular speed of the conductor portion relative to an angular speed of the output member.

6. The electric actuator of claim 1, further including an electromagnetic brake coupled to the second driving source through the transmission that, when engaged, prevents the second driving source from releasing the energy stored therein, wherein the eddy current brake and the electromagnetic brake are proximate to each other and connected to a same transmission shaft.

7. An apparatus, comprising:
   an actuator configured to change from a normal operating mode to a fail-safe operating mode upon loss of electrical power to the actuator, the actuator including:
   a differential including a first input member, a second input member, and an output member operatively coupled together to form part of a transmission in the actuator;
   an output connected to the output member of the differential that is movable between different positions including a fail-safe position;
   a first driving source connected to the first input member of the differential configured to drive the output when the actuator is in the normal operating mode;
   a second driving source connected to the second input member of the differential configured to drive the output when the actuator is in the fail-safe operating mode; and
   an eddy current brake connected to the differential that is driven by the second driving source when the actuator is in the fail-safe operating mode to generate a braking force, the eddy current brake configured to apply the braking force to the output through the transmission while the output moves to the fail-safe position.

8. The apparatus of claim 7, wherein the eddy current brake includes at least two magnets and at least one disk-shaped conductor between the at least two magnets that is supported by a transmission shaft defining a rotation axis of the disk-shaped conductor.

9. The apparatus of claim 8, wherein the eddy current brake includes a body holding the at least two magnets and at least one fastener adjustably coupling the body to a part of the actuator adjacent the disk-shaped conductor, movement of the body relative to the disk-shaped conductor causing the eddy current brake to change between a high drag state associated with a first characteristic relating to drag of the eddy current brake and a low drag state associated with a second characteristic relating to drag of the eddy current brake different from the first characteristic.

10. The apparatus of claim 7, wherein the actuator includes a gear train creating a pathway through which the second driving source and the eddy current brake are coupled to the second input member of the differential.

11. The apparatus of claim 10, wherein the actuator includes an electromagnetic brake coupled to the second input member of the differential through the pathway that is configured to lock the second input member and the gear train to prevent the second driving source from releasing energy stored therein.

12. A method for driving an electric actuator, comprising:
   supplying electrical power to a first driving source coupled to a differential driving a transmission coupled to an output or a second driving source;
   disengaging an electromagnetic brake of the electric actuator coupled to the second driving source to enable the differential to transfer energy through the transmission from the first driving source to the second driving source;
   storing energy in the second driving source from the first driving source;
   engaging the electromagnetic brake to prevent the second driving source from releasing energy stored therein;
   disengaging the electromagnetic brake upon loss of the electrical power to enable the differential to transfer energy through the transmission from the second driving source to the output and an eddy current brake of the electric actuator; and
   generating, via the eddy current brake, a braking force that is applied to the output through the transmission to reduce a speed at which the second driving source moves the output to a fail-safe position.

13. The method of claim 12, further including adjusting a magnet portion of the eddy current brake supported by the electric actuator relative to a conductor portion of the eddy current brake coupled to a transmission shaft to change the braking force.

\* \* \* \* \*